June 2, 1931. L. WIMMER 1,808,092

TOP RELIEF VALVE FOR SULPHITE DIGESTERS

Filed July 21, 1930 2 Sheets-Sheet 1

Inventor
Leopold Wimmer
by
Attorney

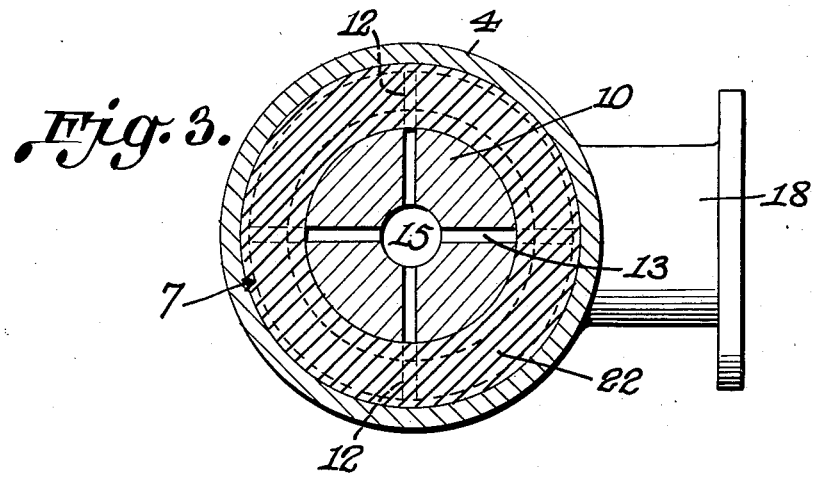
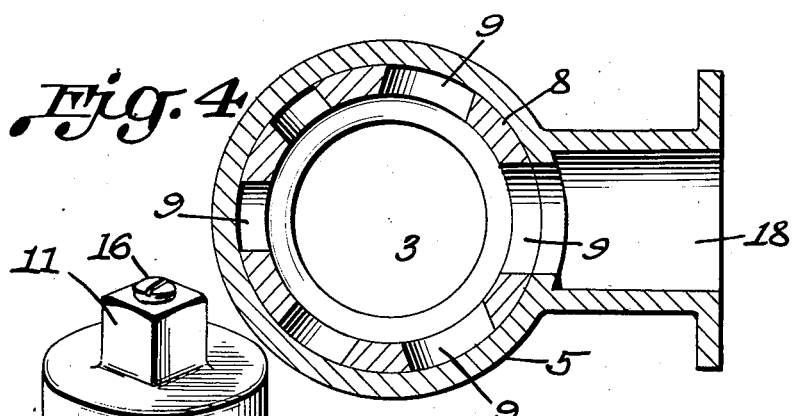
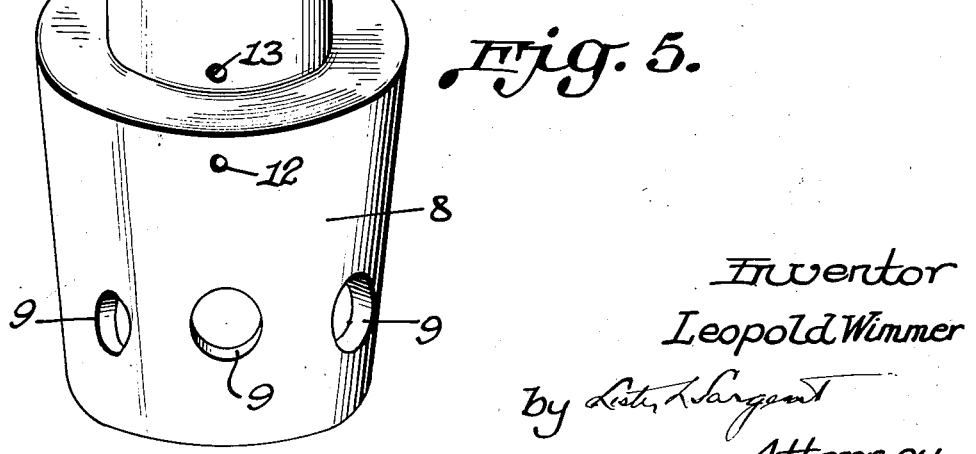

Patented June 2, 1931

1,808,092

UNITED STATES PATENT OFFICE

LEOPOLD WIMMER, OF MUSKEGON, MICHIGAN

TOP RELIEF VALVE FOR SULPHITE DIGESTERS

Application filed July 21, 1930. Serial No. 469,537.

The object of my invention is to provide a novel and efficient top relief valve for use in sulphite digesters to regulate the flow of fluid under pressure during the cooking period, such as the relief flow on top of sulphite digesters; or to regulate other high pressure flows where there is a requirement for an exact knowledge of the amount of flow going through a plug valve at different times; and to provide a device which will enable the operator to change the size of the stream flowing through the valve to a larger or smaller stream at any time it requires.

I attain these and other objects of my invention by the apparatus illustrated in the accompanying drawings, in which,—

Fig. 3 is a horizontal section on line 2—2 of Fig. 2;

Fig. 4 is a longitudinal section on line 3—3 of Fig. 2; and

Fig. 5 is a perspective view of the relief valve removed from the valve casing.

Like numerals designate like parts in each of the several views.

Figure 1:
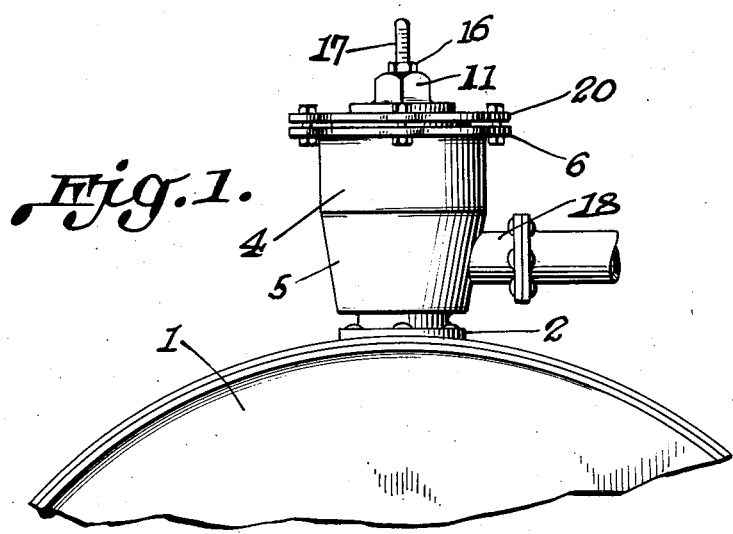
Figure 1 is a side elevation.
Figure 2:
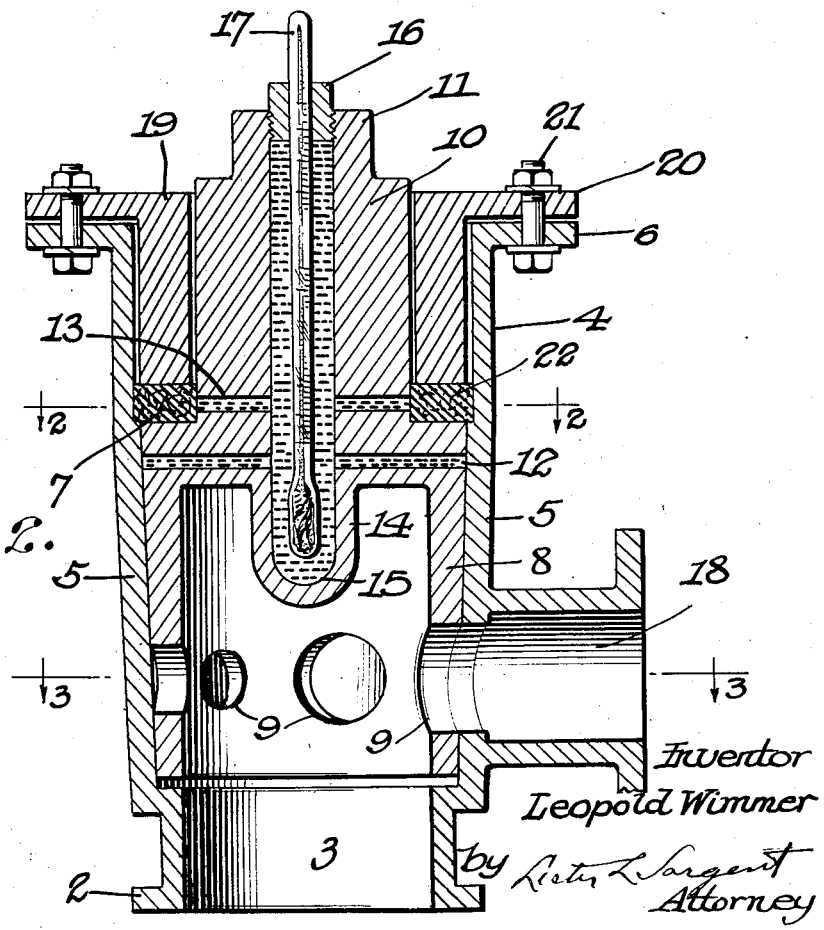
Fig. 2 is a vertical section.

Referring to the accompanying drawings, I provide a valve casing 4 having the lower portion 5 thereof frusto-conical in shape and adapted to receive the correspondingly shaped revoluble relief valve 8, as shown in Fig. 5, which valve is provided with any suitable number of openings 9 of different sizes, as shown in Fig. 2, and arranged to be brought into alignment with the passage 18, or which can be closed by turning the plug end 10 of plug valve 8 against passage 18.

The relief valve 8 is provided with a central cupped portion 14 to form an extension of the chamber 15 through the plug 10 to receive the thermometer 17.

The conical portion 5 of the valve casing is provided with a bottom annular flange 2 by means of which it is bolted or riveted to the digester tank 1. I provide a large passage 3 to the hollow portion of the revoluble relief valve 8, as shown in Fig. 2.

Mounted in the upper portion 4 of the valve casing is a plug 10 which is provided with an annular shoulder or enlargement at 7. Plug 10 is provided with a squared end 11 for engagement by a wrench at its upper end, and its lower end is integral with the hollow valve 8.

I provide a central chamber 15 through the plug 10 and terminating in the cupped portion 14 of relief valve 8. I provide a nut 16 mounted in the chamber at the upper end of the plug valve to support a thermometer 17.

As shown in Fig. 2, I provide oil channels 13 radiating through the valve plug 10 from the central chamber 15 to the annular packing 22 which is positioned under the packing gland 19. I also provide additional oil channels 12 formed in the shouldered portion 7 of the valve plug, as shown in Fig. 2. The annular packing gland 19 is provided with ears 20 corresponding in shape and size with the ears 6 of the valve casing 4 and functioning as means to fasten the gland to the valve casing by suitable bolts 21.

The conical shape of the casing 5 permits a tight fit of the relief valve 8 in the casing. The provision of the packing 22 and the packing gland 19 prevents any leakage occurring between the sides of the casing and the plug end of the valve. By tightening the packing gland it also holds down the plug tight against the casing as the plug is enlarged at 7.

In operation the relief valve is revolved by turning the plug end 10 to bring the desired size of opening 9 into alignment with the passage 18 to change the inlet or outlet streams from small to large or from large to small. In operating the device a wrench is applied to the squared end 11 of the plug end 10 of the valve to revolve the relief valve 8, with which the plug 10 is integral.

The inlet or outlet at the bottom of the plug valve 8 is of similar diameter to the channel 3.

My plug valve also can be used on low pressure flows, such as water and oils, pulp and paper material, or other flows where exact measure is required.

If no thermometer is used a plug 16 is provided as shown in Fig. 5, to prevent oil from escaping through should there be pressure caused by the heat of passing hot gases, etc.

What I claim is:

1. In a device of the class described, the combination of a valve casing having a frusto-conical lower portion and having an end opening and a lateral opening, a revoluble valve seated in the casing, said valve having a series of alined openings of different sizes adapted to be brought into communication with the lateral opening of the valve casing, a valve plug integral with the valve and having a shouldered portion, radiating oil passages in said valve plug, a packing positioned above the shoulder of the plug, and a packing gland adapted to be fastened to the casing and seating on the packing.

2. In a device of the class described, the combination of a valve casing conical in its lower portion, and having an end opening and a lateral opening, a revoluble hollow valve seated in the casing said valve having a plurality of alined openings of different sizes adapted to register with the lateral opening of the valve casing, a plug end integral with the valve and having an annular shoulder, radiating oil passages in the plug end of the valve, a packing, and a packing gland adapted to be fastened to the casing and seating on the packing, the valve plug having a central chamber, the valve having a recessed portion forming a chamber in alinement with the central chamber of the plug end of the valve and adapted to receive a thermometer, the aforesaid thermometer, and means for supporting the thermometer.

3. In a device of the class described, the combination of a valve casing having its lower portion frusto-conical, and having an end opening and a lateral opening, a hollow revoluble valve seated in the casing said valve having a series of horizontally alined openings of different sizes, all being adapted to be brought into registration with the lateral opening through the valve casing, a valve plug integral with the valve, radiating oil passages in the plug end of the valve, a packing positioned above a shouldered portion of the plug end of the valve, a packing gland adapted to be fastened to the casing and seating on said packing, the valve plug having a central chamber, the valve having a recessed portion forming a chamber in alinement with the central chamber of the valve plug and adapted to receive a thermometer, a nut having threaded engagement with the upper end of the valve plug, and adapted to close same when the thermometer is not used.

LEOPOLD WIMMER.